United States Patent
Chan (10) Patent No.: US 9,669,924 B2
(45) Date of Patent: Jun. 6, 2017

(54) UNMANNED AERIAL VEHICLE

(75) Inventor: Keen Ian Chan, Singapore (SG)

(73) Assignee: Singapore Technologies Aerospace Ltd, Paya Lebar (SG)

(*) Notice: Subject to any disclaimer, the term of this patent is extended or adjusted under 35 U.S.C. 154(b) by 96 days.

(21) Appl. No.: 14/347,375

(22) PCT Filed: Sep. 14, 2012

(86) PCT No.: PCT/SG2012/000336
§ 371 (c)(1),
(2), (4) Date: Mar. 26, 2014

(87) PCT Pub. No.: WO2013/048339
PCT Pub. Date: Apr. 4, 2013

(65) Prior Publication Data
US 2014/0217229 A1    Aug. 7, 2014

(30) Foreign Application Priority Data

Sep. 27, 2011    (SG) .................... 201107008-3

(51) Int. Cl.
*B64C 27/08* (2006.01)
*B64C 29/02* (2006.01)
(Continued)

(52) U.S. Cl.
CPC ............. *B64C 29/02* (2013.01); *A63H 27/12* (2013.01); *B64C 13/24* (2013.01); *B64C 27/08* (2013.01);
(Continued)

(58) Field of Classification Search
CPC ........ B64C 29/02; B64C 39/024; B64C 27/08; B64C 39/02; B64C 2201/088;
(Continued)

(56) References Cited

U.S. PATENT DOCUMENTS 5,289,994 A    3/1994   Del Campo Aguilera
7,874,513 B1 *  1/2011   Smith ................ B64C 11/001
                                                         244/12.4
(Continued)

FOREIGN PATENT DOCUMENTS

EP    2233393 A2    9/2010
FR    2903380 A1    7/2006
(Continued)

OTHER PUBLICATIONS

International Search Report for PCT Patent Application No. PCT/SG2012/000336, filed on Sep. 14, 2012, dated Nov. 2, 2012, 4 pages.
(Continued)

*Primary Examiner* — Philip J Bonzell
(74) *Attorney, Agent, or Firm* — Hovey Williams LLP (57) ABSTRACT

An unmanned aerial vehicle (UAV) capable of vertical and horizontal flight modes, a method for assembling a UAV, and a kit of parts for assembling a UAV. The UAV comprises a wing structure comprising elongated equal first and second wings; a support structure comprising first and second sections coupled to a middle position of the wing structure and extending in opposite directions perpendicular to the wing structure; and four propellers, each mounted to a respective one of the first and second wings, and first and second sections, for powering the UAV during both vertical and horizontal flight modes.

5 Claims, 6 Drawing Sheets

(51) Int. Cl.
*B64C 39/02* (2006.01)
*A63H 27/00* (2006.01)
*B64C 13/24* (2006.01)
*G05D 1/06* (2006.01)

(52) U.S. Cl.
CPC ............ *B64C 39/02* (2013.01); *B64C 39/024* (2013.01); *G05D 1/0669* (2013.01); *B64C 2201/028* (2013.01); *B64C 2201/042* (2013.01); *B64C 2201/088* (2013.01); *B64C 2201/104* (2013.01); *B64C 2201/165* (2013.01); *Y10T 29/49826* (2015.01)

(58) Field of Classification Search
CPC ........ B64C 2201/104; B64C 2201/165; B64C 2201/028; B64C 2201/042; A63H 27/12
See application file for complete search history.

(56) References Cited

U.S. PATENT DOCUMENTS

| | | | | |
|---|---|---|---|---|
| 8,256,715 B2* | 9/2012 | Ballard | ................ | B64C 39/024 244/123.1 |
| 2005/0178879 A1* | 8/2005 | Mao | ........................ | B64C 29/02 244/7 B |
| 2010/0123042 A1* | 5/2010 | Ballard | ................ | B64C 39/024 244/118.1 |
| 2011/0001020 A1* | 1/2011 | Forgac | ................ | B64C 29/0033 244/7 A |
| 2011/0042508 A1* | 2/2011 | Bevirt | .................... | B64C 15/00 244/12.4 |
| 2012/0056041 A1 | 3/2012 | Rhee et al. | | |

FOREIGN PATENT DOCUMENTS

FR    2903380 A1    1/2008
WO   2011/149544    12/2011

OTHER PUBLICATIONS

European Search Report dated Jun. 1, 2015 for related European Patent Application No. 12835896.7; 6 pages.
Office Action from related European Application No. EP 12835896.7, dated May 18, 2016, 5 pages.

* cited by examiner

UNMANNED AERIAL VEHICLE

RELATED APPLICATIONS

This application is a national stage application, under 35 U.S.C. §371 of International Patent Application No. PCT/SG2012/000336, filed on Sep. 14, 2012 and published as WO 2013/048339 on Apr. 4, 2013, which claims priority to Singapore Application No. SG 201107008-3, filed on Sep. 27, 2011, which is hereby incorporated by reference in its entirety.

FIELD OF INVENTION

The present invention relates broadly to an unmanned aerial vehicle (UAV) capable of vertical and horizontal flight modes, to a method of assembling a UAV, and to a kit of parts for assembling a UAV.

BACKGROUND

An important capability enhancement of Vertical Take-Off and Landing (VTOL) aircraft is the ability to transition from vertical flight to horizontal flight during take-off, and vice versa during landing. There have been many designs that attempt to achieve such capability. For example, the tail-sitter design, such as model no. XFV-1 of the 1950s, using the same set of flight controls for both vertical and horizontal flight, represents one of the most direct ways of achieving transition flight. However, with the pilot facing upwards during vertical flight, making visual assessments, e.g. during landing, can be difficult.

Also, tail-sitter aircraft have other technical issues. For example, they tend to be susceptible to toppling, e.g. when landing under windy conditions. This is due to a high centre of gravity, relative to the size of the tail base. Addressing this issue may involve installing landing gears of a wide span or enlarging the span of the tail base to cover a wider area on the ground. However, these measures usually add weight and aerodynamic drag, which in turn may compromise the performance (e.g. cruise endurance) of the aircraft.

One existing solution to the above problems comprises using configurations that remain horizontal during transition, e.g. tilt-wings and/or tilt-rotors. This may also render the aircraft suitable for carrying passengers. However, tilt-wings and tilt-rotors need separate sets of flight controls for helicopter-mode and airplane-mode flight, resulting in high complexity in their development and implementation.

Unmanned aircraft, also known as unmanned aerial vehicles (UAVs), on the other hand, do not carry passengers or pilots. Hence, passenger- and pilot-related limitations of tail-sitters are not applicable to the design of transition-capable VTOL UAVs.

However, there are other issues which may arise during the development of autonomous flight transition for an UAV. For example, a typical transition manoeuvre spans a wide range of airspeeds and angles-of-attack. The presence of variables which cover a wide range of values, when multiplied in combinations with the other variables, can potentially result in massive aerodynamic databases for adequate coverage of the transition envelope. This may require significant effort and cost to generate by means such as wind tunnel testing, computational fluid dynamics (CFD) etc., when developing autonomous transition. In addition, highly non-linear aerodynamic characteristics and changes in stability characteristics associated with higher angles-of-attack require complex, non-linear control strategies and algorithms to be developed, further adding to the complexity of development efforts.

Figure 1:
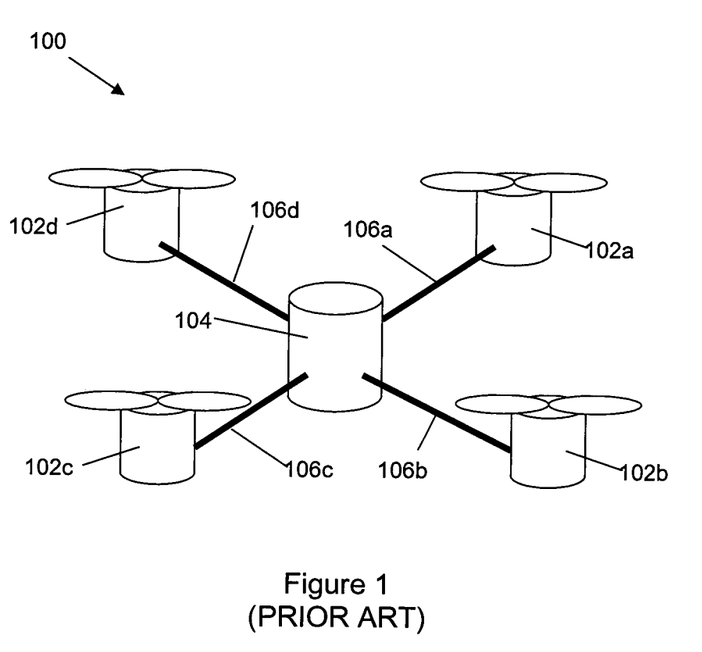
FIG. 1 shows a schematic diagram illustrating a conventional quadrotor aircraft.

One existing VTOL aircraft design that is capable of aggressive manoeuvres is the quadrotor design, which is mechanically simple and light-weight. FIG. 1 shows a schematic diagram illustrating a conventional quadrotor aircraft 100 comprising four rotors 102a-d, each coupled to a fuselage 104 via a respective support arm 106a-d. Typically, the rotors 102a-d have the same size and are disposed at the same distance from the fuselage 104 for the balance of weight and thrust moments. However, quadrotor aircraft such as the one shown in FIG. 1 operate in the helicopter-mode, and are not capable of flying in the airplane-mode.

A need therefore exists to provide a UAV that seeks to address at least some of the above problems.

SUMMARY

In accordance with a first aspect of the present invention, there is provided an unmanned aerial vehicle (UAV) capable of vertical and horizontal flight modes, comprising:

a wing structure comprising elongated equal first and second wings;

a support structure comprising first and second sections coupled to a middle position of the wing structure and extending in opposite directions perpendicular to the wing structure; and four propellers, each mounted to a respective one of the first and second wings, and first and second sections, for powering the UAV during both vertical and horizontal flight modes.

At least portions of respective trailing edges of the wing structure and support structure may be disposed on the same plane.

The portions of respective trailing edges of the wing structure and support structure may contact a ground when the UAV is in a sitting position.

The propellers may be mounted to the respective wings and sections at predetermined positions such that the propellers may not interfere with each other or with another structure of the UAV.

The propellers may be mounted to the first and second wings, and first and second sections at at least one of respective leading edges and trailing edges.

The UAV may further comprise a fuselage partially integrated with the wing structure at the middle point of the wing structure.

Rotational speeds of the respective propellers may be independently controlled.

The propellers mounted to the first and second wings may be configured to rotate in a first direction, while the propellers mounted to the first and second sections may be configured to rotate in a second direction opposite to the first direction.

The same flight controls may be used for both vertical and horizontal flight modes.

Flight controls for roll, pitch and yaw in vertical and horizontal flight modes may be decoupled.

The UAV may be configured for vertical take off and landing independent of a runway or other launch and recovery equipment.

The UAV may be further configured for an autonomous transition between the vertical and horizontal flight modes, and vice versa, based on a predetermined range of angles-of-attack.

The angles-of-attack may be within a linear aerodynamic regime.

In accordance with a second aspect of the present invention, there is provided a method for assembling an unmanned aerial vehicle (UAV), the method comprising the steps of:

providing a wing structure comprising elongated equal first and second wings;

coupling a support structure comprising first and second sections to a middle position of the wing structure such that the first and second sections extend in opposite directions perpendicular to the wing structure; and mounting a propeller to a respective one of the first and second wings, and first and second sections, for powering the UAV during both vertical and horizontal flight modes.

Coupling the support structure to the middle position of the wing structure may comprise disposing at least portions of respective trailing edges of the wing structure and support structure on the same plane.

Mounting the propellers to the respective wings and sections may comprise mounting at predetermined positions such that the propellers may not interfere with each other or with another structure of the UAV.

Mounting the propellers to the first and second wings, and first and second sections may comprise mounting the propellers at at least one of respective leading edges and trailing edges.

The method may further comprise partially integrating a fuselage with the wing structure at the middle point of the wing structure.

In accordance with a third aspect of the present invention, there is provided a kit of parts for assembling an unmanned aerial vehicle (UAV), the kit of parts comprising:

a wing structure comprising elongated equal first and second wings;

a support structure comprising first and second sections adapted to be coupled to a middle position of the wing structure and extend in opposite directions perpendicular to the wing structure; and four propellers, each adapted to be mounted to a respective one of the first and second wings, and first and second sections, for powering the UAV during both vertical and horizontal flight modes.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 2:
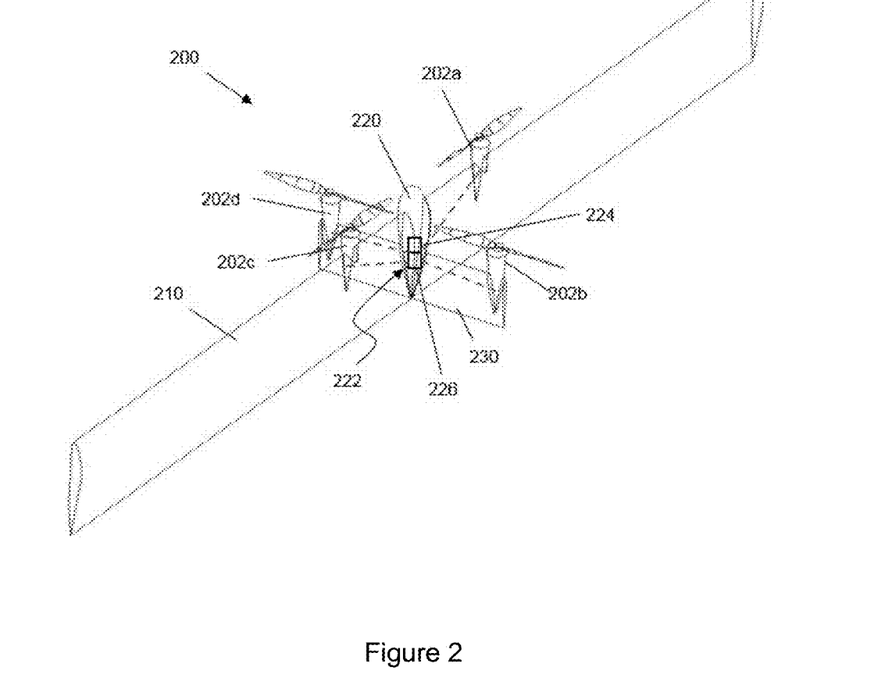
FIG. 2 shows a UAV according to an example embodiment in a Vertical Take-Off and Landing orientation.
Figure 3:
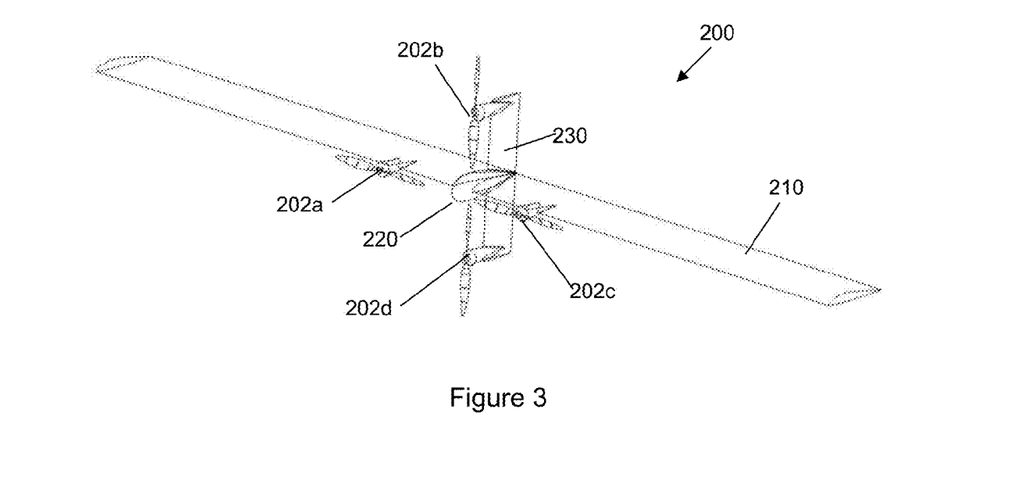
FIG. 3 shows the UAV of FIG. 2 in an airplane-mode orientation.

FIG. 2 shows a UAV 200 according to an example embodiment in a Vertical Take-Off and Landing orientation. FIG. 3 shows the UAV of FIG. 2 in an airplane-mode orientation. The UAV 200 comprises an elongated wing structure 210 configured to provide lift when the UAV 200 is in a horizontal flight (i.e. airplane-mode). For example, the wing structure 210 may comprise an airfoil structure, as will be appreciated by a person skilled in the art. In addition, the wing structure 210 in an example embodiment is a high aspect ratio (i.e. ratio of span over chord in the case of rectangular wing platforms) monoplane wing for high cruise efficiency. In one preferred implementation, the cross-section of the wing structure 210 is uniform from one wing tip to the other wing tip (i.e. rectangular wing), for simplifying fabrication and assembly. Additionally, such implementation allows the UAV 200 to sit on a trailing edge of the wing structure 210. In another example implementation, the cross-section of the wing structure 210 is wider at a section adjacent a fuselage 220, and progressively tapers toward the wing tip, for improving aerodynamic efficiency. The wing structure 210 is preferably fabricated from a light weight and durable material, e.g. a composite.

The fuselage 220 is located at the middle of the wing structure 210, and divides the wing structure 210 into a left wing and a right wing. For example, the wing structure 210 comprises a single continuous structure and the fuselage is assembled to its mid-point. Alternatively, the wing structure 210 can comprise separate left and right wings assembled to the fuselage 220. Typically, the fuselage 220 comprises a rigid housing that contains e.g. electronic components 221 for controlling the UAV 200, power source 222 (FIG. 2)—also referred to as powerplant, surveillance equipment, communication equipment, etc. The rigid housing may protect such components and devices against damage in case of impact.

As can be seen from FIGS. 2 and 3, a support structure 230 is mounted to the fuselage 220 such that the fuselage 220 divides the support structure 230 into an upper section and a lower section (hereinafter interchangeably referred to as upper and lower pylons respectively). The support structure 230, which can have a symmetric airfoil section typical of vertical fins, has a span of adequate length to accommodate propellers 202b and 202d without interference with any other structure of the aircraft, or propellers 202a and 202c. Moreover, the support structure 230 is perpendicular to the wing structure 210 such that the UAV 200 has a cruciform profile when seen from the front while in airplane mode. At least portions of the trailing edge of the support structure 230 is disposed on the same plane as at least portions of the trailing edge of the wing structure 210, thus allowing the UAV 200 to be in a sitting position with these portions of the respective trailing edges contacting the ground. The support structure 230 can provide directional stability when the UAV 200 is in the airplane-mode flight. Similar to the wing structure 210, the support structure 230 is preferably fabricated from a light weight and durable material such as a composite.

In example embodiments, the UAV 200 is powered by four propellers 202a-d (which function as rotors during vertical flight), which are disposed similar to the quadrotor configuration. For example, two propellers 202a, 202c are mounted to the left and right wings of the wing structure 210, while two propellers 202b, 202d are mounted to the upper and lower sections of the support structure 230, respectively. Preferably, propellers 202a and 202c have the same sizes and are mounted at equal distances to the fuselage 220. Similarly, propellers 202b and 202d have the same sizes and are mounted at equal distances to the fuselage 220. In example embodiments, the distances are such that the propellers 202a-d do not interfere with each other or with any other structure of the UAV 200, e.g. the fuselage 220.

Further, in the example embodiment, propellers 202a, 202c are disposed at the leading edge of the wing structure 210, while propellers 202b, 202d are disposed at the leading edge of the support structure 230. Alternative embodiments may include the placement of propellers 202a-d at any of the respective trailing edges in a pusher arrangement. In such embodiments, the drag on the aircraft may be lower as the slipstream makes no contact with the aircraft structure, but it may then be more difficult to design the aircraft to sit on a ground with portions of the trailing edges of wing structure 210 and support structure 230 contacting the ground.

Figure 4:
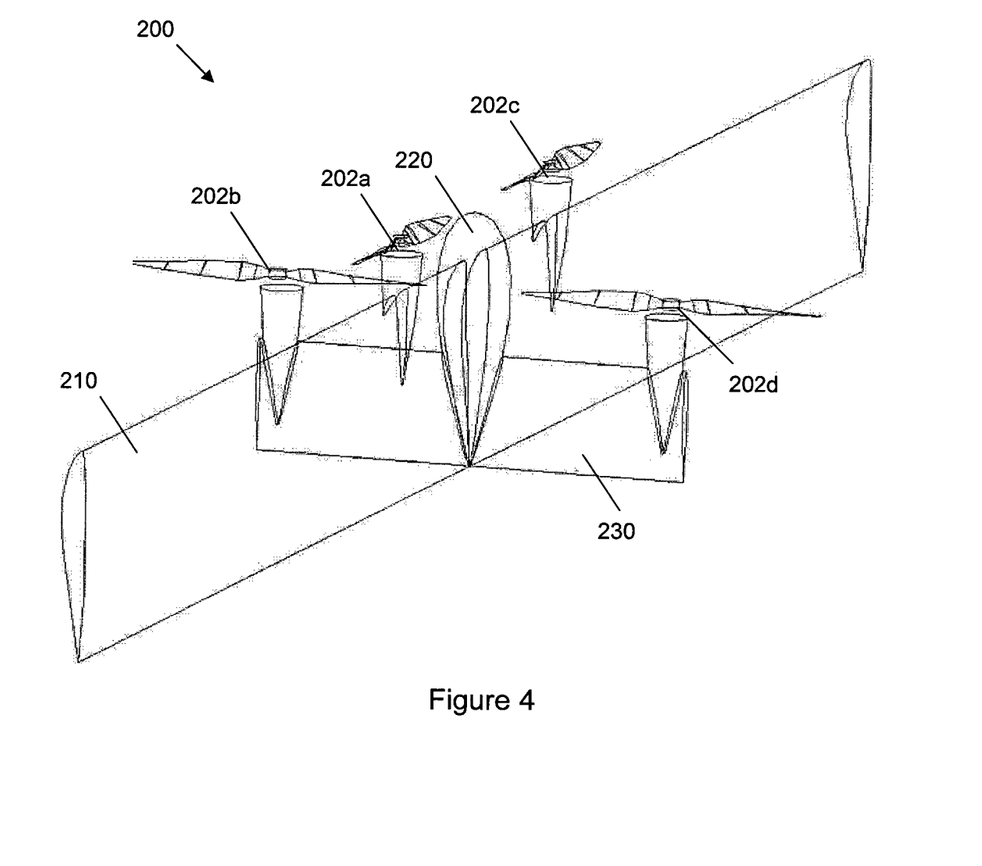
FIG. 4 shows an alternate view of the UAV of FIG. 2.

FIG. 4 shows an alternate view of the UAV 200 of FIG. 2. The UAV 200 sits on a ground, e.g. before take-off or after landing, in this orientation, with the tip of the fuselage 220 pointing vertically upward. As can be seen from FIG. 4, the base of the UAV 200 is wide relative to its resting height, resulting in a substantially low centre of gravity in the example embodiments. For example, the fuselage 220 is almost completely integrated into the wing structure 210, and does not extend significantly above the wing structure 210. The propellers 202a and 202c, 202b and 202d are also partially integrated into the wing structure 210 and support structure 230 respectively. In addition, the UAV 200 does not use a tail boom, thus reducing the resting height. Further, in the resting position, the pylons for propellers 202b, 202d (utilising the support structure 230) are positioned on the ground, thus providing support to the UAV 200 on the ground, and resulting in no need for additional weight or landing gears. The low centre of gravity can improve the UAV 200's robustness to toppling in situations such as ground handling, landing in a wind, or rolling ship decks.

From the resting position as shown in FIG. 4, the UAV of the example embodiments can be vertically launched, without requiring a runway or launch equipment. During launch (and also during landing), the propellers 202a-d (FIG. 2) function as rotors to provide lift to the UAV 200 (FIG. 2). The UAV 200 thus can lift off from the ground in the same manner as a helicopter. It will be appreciated that the propeller speeds may be adjusted to maintain a vertical flight direction during take off. Once a predetermined height, e.g. a safety clearance, and speed, e.g. stall speed or above, is achieved, the UAV 200 starts to transition to a horizontal flight, during which it usually conducts its main functions, e.g. surveillance, communication relaying, etc.

Figure 5:
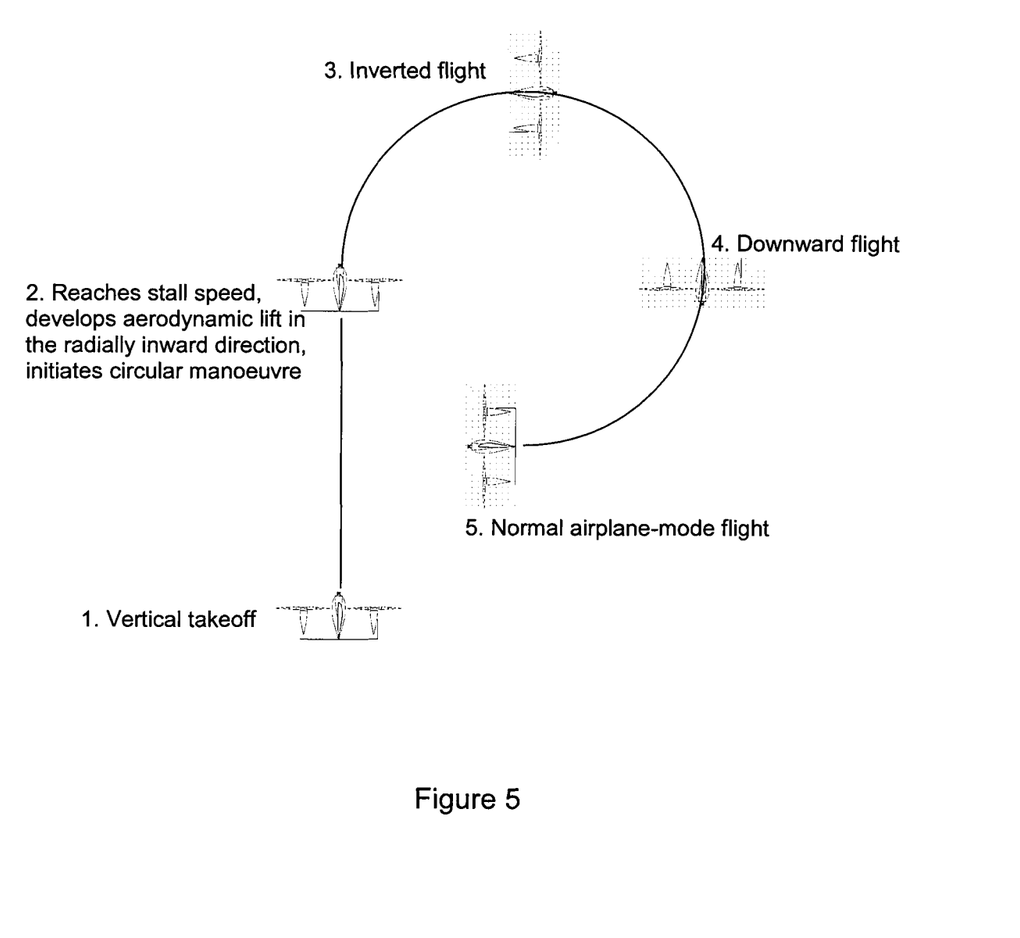
FIG. 5 shows a schematic diagram illustrating a typical transition manoeuvre by the UAV of FIG. 2 according to an example embodiment.

FIG. 5 shows a schematic diagram illustrating a typical transition manoeuvre by the UAV 200 of FIG. 2 according to an example embodiment. As described above, transition from a vertical flight (helicopter mode) to a horizontal flight (airplane mode) uses a vertical climb, followed by a circular manoeuvre. At stage 1, the UAV 200 performs a vertical take-off. At stage 2, the UAV 200 reaches the predetermined height and speed, and starts to perform the circular manoeuvre. At stage 3, the UAV 200 reaches the maximum point of the circular manoeuvre, where it momentarily performs an inverted flight. At stage 4, the UAV 200 is momentarily downwardly oriented. At stage 5, the UAV 200 completes the transition manoeuvre and starts flying in the airplane mode.

For landing, it will be appreciated that the UAV 200 starts from the airplane mode. The UAV 200 may descend to a predetermined height, where it transitions toward the helicopter mode, e.g. by performing a pull-up manoeuvre that covers the quarter of the circular manoeuvre between stage 5 and stage 2 (FIG. 5), thereby briefly increasing its flying height. Once the UAV 200 is in a vertical orientation, its height (z-coordinate) is controllably decreased and its ground position (x-, y-coordinates) is controllably adjusted, e.g. by controlling the speeds of the respective propellers 202a-d (FIG. 2), such that the UAV 200 can descend and land on a designated position on the ground, without requiring a runway or landing equipment.

In a preferred embodiment, the UAV 200 is capable of executing the circular manoeuvre (for flight transition) that involves only linear aerodynamics. That is, throughout the transition manoeuvre, the angles-of-attack of the UAV 200 are within the linear, pre-stall range. This may be achieved, for example, by adequately powering and controlling the speed of the UAV 200, hence the radius of the circular motion. For example, the speed is at least the stall speed, with higher speeds utilising more power and requiring a more powerful engine.

Typically, the circular manoeuvre needs a significant power margin to accomplish as certain portions involve a vertical climb at speeds equal to at least the stall speed. As the UAV of the example embodiments has no tail boom, landing gear, control surfaces, or tilting mechanisms and associated actuators, the UAV is inherently lightweight, a feature that can facilitate meeting the severe power margin requirements of the circular manoeuvre while operating in the linear regime of aerodynamics.

Thus, during the development of an aerodynamic model for autonomous transition, there is no need to deal with the characteristics of complex, non-linear aerodynamics at high angles-of-attack, nor the complex changes in stability characteristics. Furthermore, as the transition uses only a narrow range of angles-of-attack and flight speeds, the size of the aerodynamic database needed for adequate coverage of the transition envelope may be significantly reduced, along with the cost and effort needed to generate it. In the example embodiments, these can result in distinct reductions in the complexity of aerodynamic modelling for autonomous transition development.

Referring to FIG. 5, the power requirements are typically most severe (i.e. highest) at stage 2, which involves a vertically climbing flight. In example embodiments, the powerplant 222 (FIG. 2) of the UAV, e.g. utilising fuel cells 224 (FIG. 2), is configured to provide adequate power to move the UAV through this stage. Maximum power requirement may depend on factors such as total weight of the UAV, maximum speed, acceleration, etc. In some embodiments, a hybrid fuel cell system may be used for the powerplant 222, in case the power requirements exceed the power available from commercially available fuel cells. Such a hybrid fuel cell system typically comprises e.g. lithium-polymer batteries 226 (FIG. 2) in addition to the fuel cells 224, for providing power for the more severe vertical and transition flight phases, following which the fuel cells 224 can kick in for airplane mode cruise flight.

Figure 6:
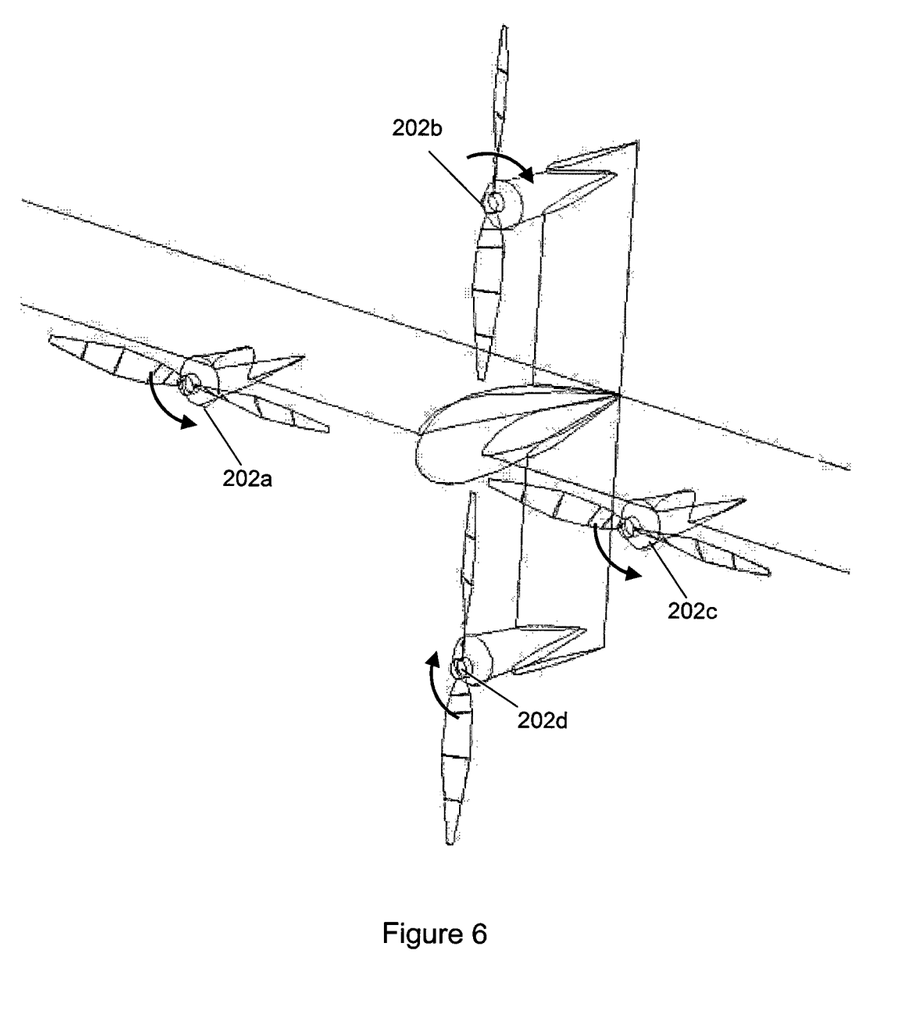
FIG. 6 shows a schematic diagram illustrating rotational directions of propellers of the UAV of FIG. 2 according to an example embodiment.

FIG. 6 shows a schematic diagram illustrating rotational directions of propellers 202a-d of the UAV 200 of FIG. 2 according to an example embodiment. Here, UAV 200 is in a horizontal orientation and the propellers 202a-d are being seen from the front. The rotational speeds of propellers 202a-202d are individually and independently controlled in the example embodiment. In one implementation, propellers 202a and 202c rotate counter-clockwise, while propellers 202b and 202d rotate clockwise. The '+' configuration of the propellers 202a-d, when seen from the front, enable the usual quadrotor controls in the helicopter mode to be directly translated into the usual roll, pitch and yaw controls in the airplane mode.

For example, referring to FIG. 6, the flight control principle for the UAV 200 in the airplane mode flight can be established such that pitch is controlled by the differential thrust between propellers 202b and 202d; yaw is controlled by the differential thrust between propellers 202a and 202c; and roll is controlled by the differential thrust between two pairs of propellers (202b and 202d) and (202a and 202c). In other words, pitch, yaw and roll controls are decoupled, and only one set of flight control effectors is used in the example embodiments for both vertical and horizontal flight modes. In addition, no additional control surfaces or tilting mechanisms are required. The reduction in weight contributes to meeting the severe power margin requirements for transition using the circular manoeuvre. In the example embodiments, the above control features may result in a distinct reduction in the design complexity of the UAV.

Figure 7:
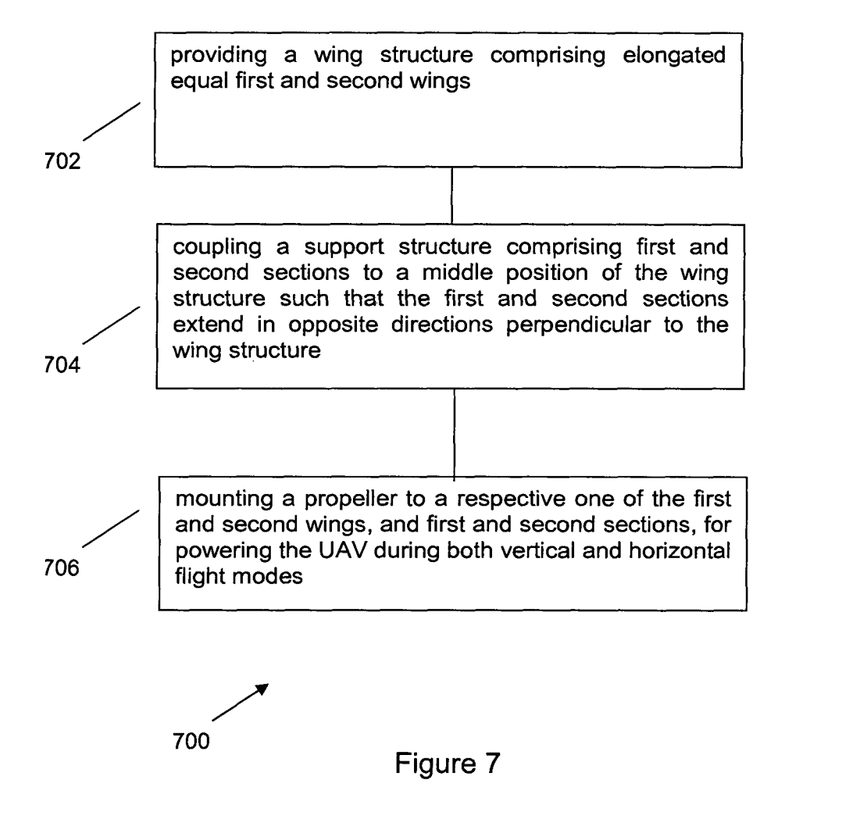
FIG. 7 shows a flow chart illustrating a method of assembling a UAV according to an example embodiment.

FIG. 7 shows a flow chart 700 illustrating a method of assembling a UAV according to an example embodiment. At step 702, a wing structure comprising elongated equal first and second wings is provided. At step 704, a support structure comprising first and second sections is coupled to a middle position of the wing structure such that the first and second sections extend in opposite directions perpendicular to the wing structure. At step 706, a propeller is mounted to a respective one of the first and second wings, and first and second sections, for powering the UAV during both vertical and horizontal flight modes.

The UAV according to the example embodiments advantageously does not require launch or recovery equipment, runway, or tilting mechanisms. Preferably, a single set of flight controls can be used, and the same controls concept can be applied in both vertical and horizontal flight modes. In addition, flight controls for roll, pitch and yaw are decoupled in vertical and horizontal flight modes. Thus, the UAV in the example embodiments may be less complex than tilt-rotor and tilt-wing equivalents. Moreover, the low centre of gravity may advantageously allow stable ground handling, landing in a wind, or on rolling ship decks. This may also reduce the susceptibility to toppling found in tail-sitters. Further, the UAV according to the example embodiment is advantageously configured to accomplish flight transition using only the linear range of angles-of-attack. This may result in a distinct reduction in the cost, effort and complexity in the development of autonomous transition. The size (and cost to generate it) of the aerodynamic database for adequate coverage of the transition envelope may be reduced. This may also render unnecessary the characterization and analysis of the highly non-linear and complex aerodynamics which occur at the high angle-of-attack region, or the development of complex algorithms to achieve autonomous control over this region. Advantageously, the UAV of the example embodiments can make use of fuel cells (which have high energy densities or electrical charges per unit weight) for power during airplane mode cruise, for achieving high endurance. Meeting the severe power margin requirements of the transition manoeuvre may be facilitated by the UAV being inherently light in weight, as it has no tail boom, landing gear, control surfaces, or tilting mechanisms and associated actuators.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method of transitioning between a vertical flight mode and a horizontal flight mode, the method comprising the steps of:
   providing a UAV having:
      a wing structure comprising elongated equal first and second wings,
      a support structure comprising first and second sections coupled to a middle position of the wing structure and extending in opposite directions perpendicular to the wing structure,
      four propellers, each mounted to a respective one of the first and second wings, and first and second sections;
      a single powerplant continuously connected to each of the propellers during both the vertical and horizontal flight modes, the powerplant having a power rating based on at least a weight of the UAV; and
      electronic components configured to control the UAV based on an aerodynamic model covering a linear aerodynamic range of angles-of-attack;
   operating the powerplant to drive the propellers to perform a vertical climb to a speed equal to at least a stall speed of the UAV; and
   at a predetermined height of the UAV and said speed, executing a circular maneuver about a vertical plane to transition from the vertical flight mode to the horizontal flight mode, the circular maneuver having a radius based on said speed,
   wherein angles-of-attack of the wing structure are within a linear aerodynamic range throughout the transition.

2. The method as claimed in claim 1, wherein rotational speeds of the respective propellers are independently controlled.

3. The method as claimed in claim 1, wherein the same flight controls are used for both vertical and horizontal flight modes.

4. The method as claimed in claim 1, wherein flight controls for roll, pitch and yaw in vertical and horizontal flight modes are decoupled.

5. The method as claimed in claim 1, wherein the steps of operating the powerplant and executing a circular maneuver are performed autonomously by the electronic components.

* * * * *